United States Patent [19]

Baur et al.

[11] 4,113,360
[45] Sep. 12, 1978

[54] INDICATING DEVICE FOR ILLUSTRATING SYMBOLS OF ALL KINDS

[75] Inventors: Güenter Baur, Freiburg; Waldemar Greubel, Denzlingen, both of Germany

[73] Assignee: Siemens Aktiengesellschaft, Berlin & Munich, Fed. Rep. of Germany

[21] Appl. No.: 782,186

[22] Filed: Mar. 28, 1977

[51] Int. Cl.² .............................................. G05D 25/00
[52] U.S. Cl. ............................... 350/285; 340/324 M
[58] Field of Search ....................... 350/269, 270, 285; 362/84; 340/324 M, 373

[56] References Cited

U.S. PATENT DOCUMENTS

| 3,376,092 | 4/1968 | Kushner | 350/285 |
| 3,463,572 | 8/1969 | Preston | 350/285 |
| 3,698,793 | 10/1972 | Tellerman | 350/285 |

Primary Examiner—John K. Corbin
Assistant Examiner—R. A. Rosenberger
Attorney, Agent, or Firm—Hill, Gross, Simpson, Van Santen, Steadman, Chiara & Simpson

[57] ABSTRACT

An indicating device for projecting symbols of all kinds characterized by a plate of fluorescent synthetic material having metallized edges to create a light trap for the fluorescent light created in the plate, a layer of light dispersing material mounted in spaced relation to a surface of the plate, contact film disposed at least in selected areas between the layer and plate, means for selectively moving portions of the layer into optical contact with the contact film and plate to cause decoupling of the fluorescent light from the plate. The means for moving includes a plurality of electrodes disposed in the device in a given pattern and means for selectively applying an electrical current to the electrodes to create a selective arrangement of electrical fields to create a display of a desired symbol. The means for moving may be a membrane on which electrodes are disposed to coact with electrodes on the plate to deflect the membrane toward the plate to move the dispersing layer into optical contact with the plate or may be a ceramic plate of ferroelectric material which on the application of electrical current to the electrodes causes a selected expansion of the plate due to remanent electrical polarization to move the layer into contact with the plate of fluorescent synthetic material.

10 Claims, 7 Drawing Figures

INDICATING DEVICE FOR ILLUSTRATING SYMBOLS OF ALL KINDS

BACKGROUND OF THE INVENTION

1. Field of the Invention

The present invention is directed to an indicating device for illustrating symbols of all kinds.

2. Prior Art

A number of different types of passive indicating devices which do not produce any light but rather spatially modulate ambient light are known. Examples of different types of these passive indicating devices are electrophoretic, electrochromic, liquid crystals and ferroelectric indicators or screens.

SUMMARY OF THE INVENTION

The present invention is directed to a matrix indicating device which functions in accordance with new principles and which offers considerable advantages in various respects to the previously known passive indicating devices.

To accomplish these tasks, the indicating device of the present invention comprises a plate of fluorescing synthetic material, said plate having metallized edges to create a light trap for fluorescent light created in the plate, a layer of light dispersing material mounted in spaced relation to a surface of said plate, a contact film disposed in at least selective areas between the layer and the plate, and means for selectively moving portions of the layer into optical contact with the contact film and plate to cause decoupling of the fluorescent light from the plate, said means including a plurality of electrodes disposed in the device in a given pattern and means for selectively applying electrical current to the electrodes to create a selected arrangement of electrical field which moves selected portions of the light dispersing layer into contact with the plate to create a display of a desired symbol.

In one embodiment of the invention, the means for selectively moving comprises a ceramic plate of ferroelectric material with electrodes disposed thereon, the layer of light dispersing material and the layer of contacting material are disposed on the ceramic plates so that an application of electrical current to the electrodes cause a selected expansion of the plate due to the remanent electrical polarization to move the layer into contact with the plate of fluorescent synthetic material to display the desired symbol.

In another embodiment of the invention, the device includes a second plate which is spaced relative to the first mentioned plate, said first mentioned plate and said second plate having parallel strip electrodes arranged on the surfaces of the two plates facing each other, the means for moving includes strip-shaped synthetic material membranes stretched between the two plates and spaced thereby by a plurality of parallel extending spacer or spacing elements which are arranged with the electrodes disposed in the spaced between the spacing elements. The membranes are provided with parallel extending electrode patterns on each surface with the pattern on one surface being connected to the pattern on the other surface, the pattern of electrodes on the membrane facing the first mentioned synthetic plate are covered with the light dispersing layer which is nonconductive and the electrodes on the opposite surface are covered by a nonconductive coating. The strip electrodes on the membrane are arranged in a cross grating pattern relative to the strip of electrodes on the surfaces of the plates to form a raster pattern of image points. Preferably, the facing surfaces of the two plates are provided with a plurality of depressions in the raster pattern with the contact film disposed in each of the depressions which film wets the surfaces of the plates but does not wet the light dispersing layer or the nonconductive film on the membranes.

DESCRIPTION OF THE PREFERRED EMBODIMENTS

Figure 1:
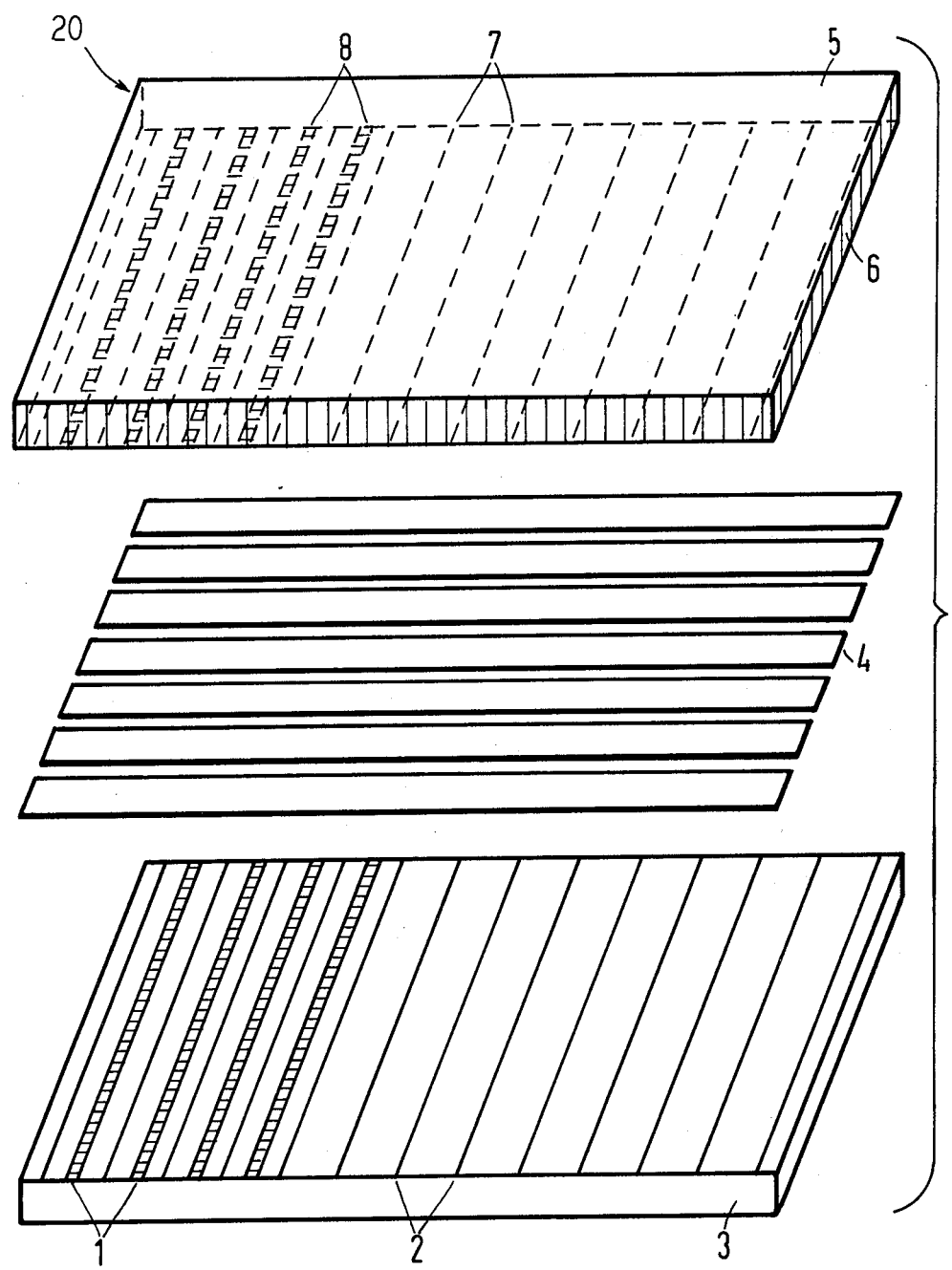
FIG. 1 is an exploded perspective view of an embodiment of the indicating device in accordance with the present invention.
Figure 2:
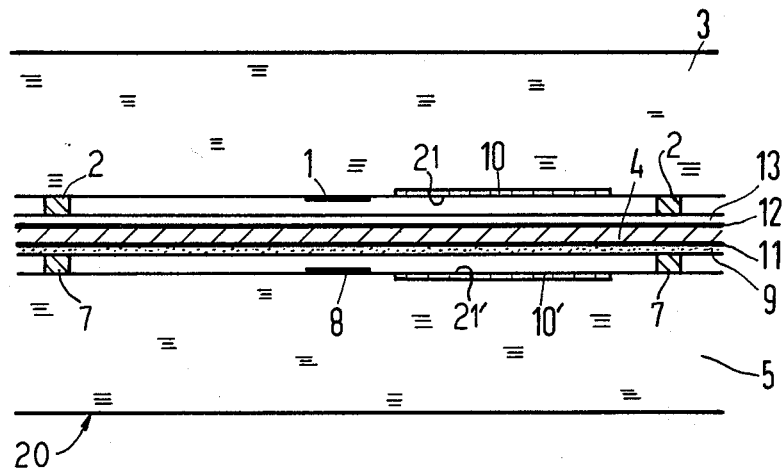
FIG. 2 is a partial cross-sectional view of the embodiment of the indicating device illustrated in FIG. 1.

The principles of the present invention are particularly useful in a passive indicating device or screen generally indicated at 20 in FIGS. 1 and 2.

The screen 20 is composed of a first plate of synthetic fluorescing material 5, a second plate 3 with synthetic membranes 4 interposed therebetween. The plate 3 is preferably a synthetic material plate such as plexiglass and is provided with a pattern of parallel extending strip electrodes 1 and parallel spacing elements 2, which, as illustrated in FIG. 1, are disposed between the electrodes 1. The plate 5 is preferably a plexiglass plate, which contains a dissolved fluorescent material and has metallized edges 6, which are illustrated by shading and which prevent the escape of a fluorescent light from the edges of the plate 5. The plate 5 also has an electrode pattern of parallel extending electrode strips 8 and spacer elements which are also parallel strips and are interposed between the electrodes 8. The strip-shaped synthetic membranes 4, as best illustrated in FIG. 1, are arranged to extend substantially perpendicular to the direction of the electrodes 1 and 8.

As best illustrated in FIG. 2, each of the membranes 4 are provided with conductive layers 11 and 12, which form strip-like electrodes that extend parallel to each membrane 4. The electrodes 11 and 12 are electrically interconnected so that a potential will be the same on both. As best illustrated in FIG. 2, the electrode or conductive layer 11 is on the surface facing the fluorescent plate 5 and is provided with a layer 9 of light dispersing material which may also be a light dispersing pigment layer, for example clear lacquer containing titanium oxide particles. On the opposite surface, electrodes 12 are coated with a coating 13 of nonconductive material. The membranes 4 are tightly stretched by the spacing elements 7 and 2 and preferably the space in which the membrane is placed between plates 3 and 5 is tightly sealed and evacuated. The plate 3 is provided with depressions 21 which are arranged in a raster pattern adjacent the cross points of electrodes 1 and 12 and plate 5 has an identical pattern of depression 21'. The depressions 21 and 21' each receive contact film 10 and 10', respectively. The material of the films 10 and 10' are selected as a suitable liquid material which will wet the surfaces of their respective plates 3 and 5 but will not wet either the layer 9 or the coating 13.

The device 20 operates on a present observation which is that a flat plexiglass plate, which has a thickness of a few millimeters with smooth surfaces and has a fluorescent material dissolved therein in such a concentration that, for example, the blue share of the impinging daylight is fully absorbed and transformed into green fluorescent light. By having the edges of the plate metallized to be ideally light reflecting, no fluorescent light can emerge therefrom. For the re-emergence or decoupling of the fluorescent light from the plate, the reflection at the flat surfaces is decisive. In a good approximation, one can compute in such a manner that if all the light impinging upon the surface under an angle $\leq \alpha_{tot}$, where $\alpha_{tot}$ is the angle of total reflection, leaves the plate, the light at the remaining angles will remain captured in the plate because of total reflection. The angle of total reflection results from the correlation of $n \cdot \sin\alpha_{tot} = 1$ and for an index of refraction $n = 1.49$ for the plexiglass, $\alpha_{tot} = 42°$. The share of the fluorescent light not totally reflected is referred to as a loss factor V which is determined by the following equation:

$$V = 1 - \cos \alpha_{tot} = \frac{n - \sqrt{n^2 - 1}}{n}$$

wherein $n = 1.49$ and $V = 25\%$. All the light emitted within the angle of total reflection (for example 75%) will be conveyed by means of a continuous loss-free total reflection in the plane of the plate.

The fluorescent light captured in the fluorescent plate because of total reflection can be removed by emergence or decoupling windows which are created by a light dispersing area. In the present invention, the emergence windows are created by bringing a light dispersing material into optical contact with the surface of fluorescent plate in an electrically-controllable manner and thus the windows may be created in a pattern of a desired symbol. Disregarding unavoidable re-emergence losses and assuming that no other losses occur in the plate, the "luminosity intensifying factor", i.e. the factor providing the accentuation of the luminescent density, which is the radiant density per unit area, of the emergence windows of the fluorescent plate, vis-a-vis the luminescent density of a colored coating having the same fluorescent material, is essentially provided by means of the proportion of the light absorbing area of the arrangement in relation to the total area of the emergence windows for the fluorescent light.

Figure 3:
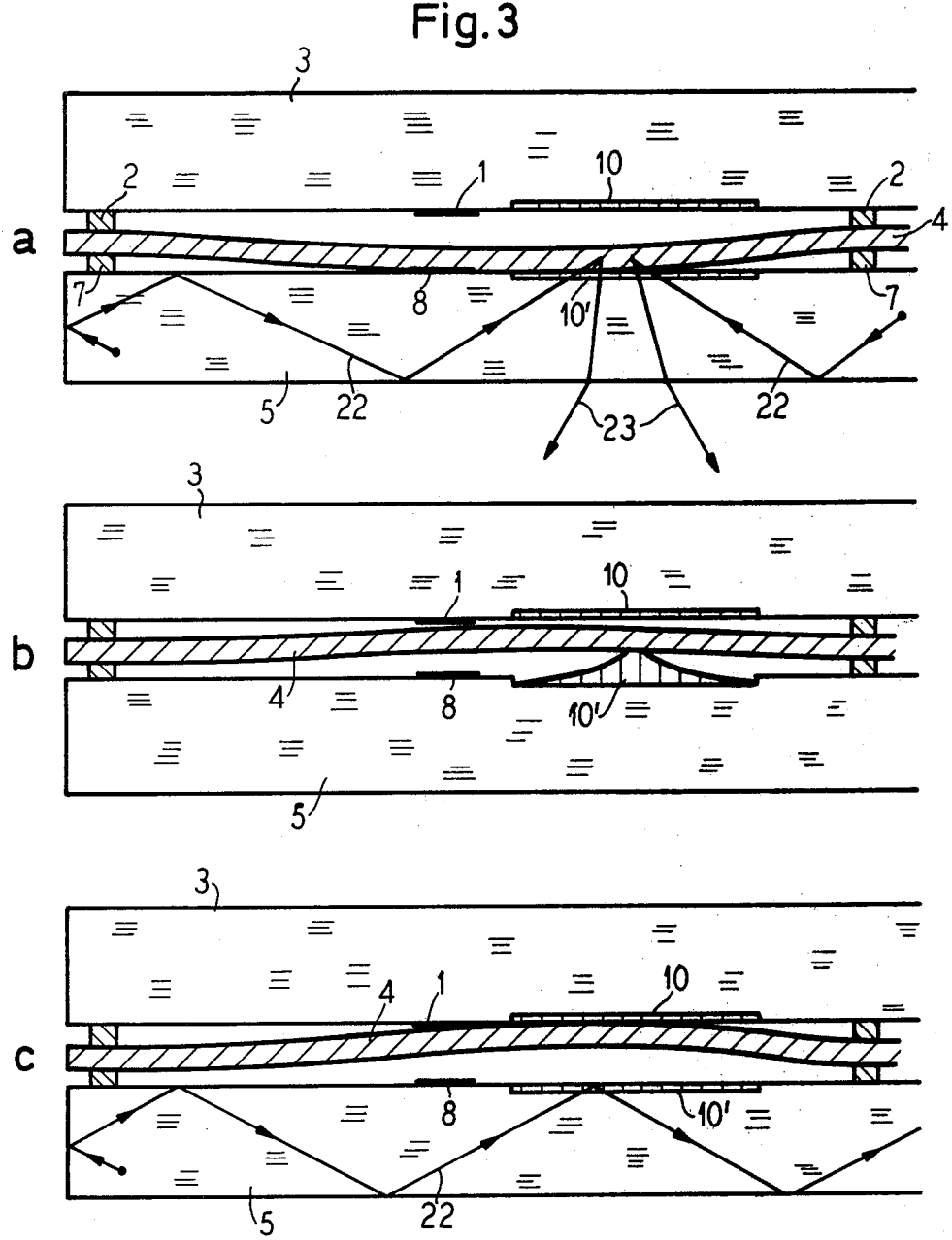
FIGS. 3a, b and c are partial cross-sectional view with portions removed for purposes of illustration similar to the cross-sectional view of FIG. 2 to illustrate the operation of the device.

If an electrical voltage is applied between the membrane electrodes 11 and 12 and electrode 8 of the plate 5, an electrical field will be created which field will have a force to attract or deflect the synthetic material membrane 4 toward the front electrode 8 and into contact with the contact film 10'. The contact of the membrane 4 with the film 10' produces an optical contact between the fluorescent plate 5 and the light dispersing layer 9, so that fluorescent light indicated by the arrows 22 will emerge from the plate at this image point or window as illustrated by the arrows 23 (FIG. 3a).

By applying electrical voltage between the back electrode 1 on the plate 3 and the membrane electrodes 11 and 12, the force of the electrical field which is created will draw or deflect the membrane 4 in a direction toward the back electrode 1 and into optical contact with the contact film 10 on the plate 3. The contact films 10 and 10' will facilitate holding of the membrane in one of these two deflected conditions which are created by surface voltage on the electrodes. As illustrated in FIG. 3b, the membrane 4 is in a transition stage during an "erasing" step and the tearing off of the liquid contact film 10' is indicated. In FIG. 3c, the membrane 4 position at an image point is in the off position so that no fluorescent light emerges at the image point.

As mentioned hereinabove, the electrodes on the plates 3 and 5 extend parallel and are aligned with each other whereas the electrodes on the membrane 4 extends perpendicular to the electrodes 1 and 8. Thus, a cross grating is formed by electrodes 1 and 8 with the electrodes 11 and 12.

Figure 4:
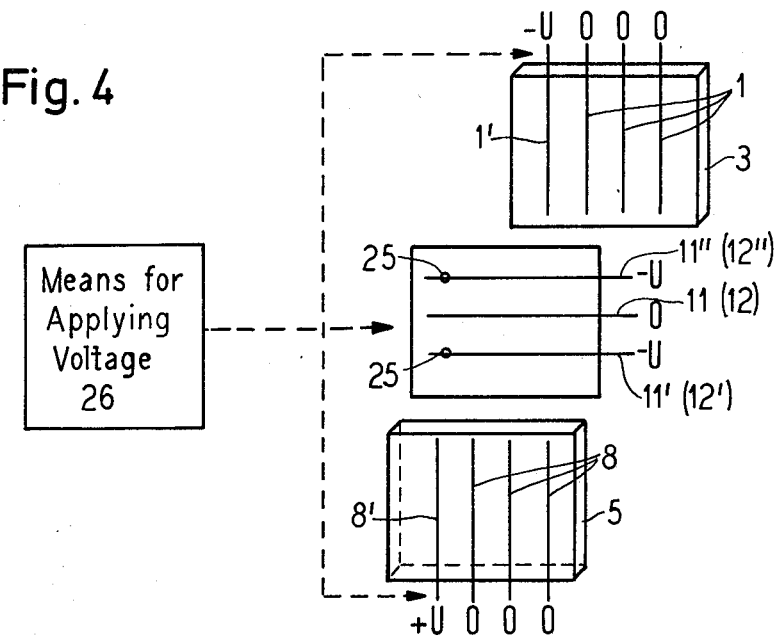
FIG. 4 is an exploded perspective view illustrating the electrode arrangement of the embodiment of FIG. 1.

In FIG. 4, electrical triggering of the screen or device 20 is schematically illustrated to switch on two image points 25, 25 by application of a voltage from means 26 for applying a voltage to the various electrodes 1, 8, 11 and 12. As illustrated, a positive voltage $+U$ is applied to one of the electrodes 8' while the remaining electrodes have zero voltage applied thereto. A corresponding negative voltage $-U$ is applied to the electrode 1' associated with electrode 8' having the positive voltage. A negative voltage $-U$ is applied to the strip electrodes 11', 11'', 12' and 12'' on the membrane 4. As a result of the application of voltages, resulting forces due to electrical fields which cause attraction of the membrane 4 will only occur at the two marked points 25, 25 and the cross-talk problem, which otherwise occurs in a conventional matrix arrangement, is completely eliminated in the matrix structure illustrated in the present invention. For clarification, we point out that the front and back electrodes are originally coupled with one another in regard to their electrical triggering. Therefore, equivalent electrodes receive the same voltage; however, the algebraic sign of the voltage is inverted. Thus, as before, the matrix is triggered by two independent cross electrodes.

To facilitate building the device illustrated in FIGS. 1–4, the following may be taken into consideration.

Aluminum or silver electrodes are advantageously used as the conductor paths or electrodes because of their high conductivity, high reflection ability for the fluorescent light, and capability with the synthetic material. Alternately, transparent electrodes of $SnO_2$ or $In_2O_3$ may be utilized.

The synthetic material plates and synthetic material membranes are selected to have the same expansion coefficient. Thus, the influence of temperature upon the membrane voltage and thus upon the electrical identifying data is removed.

The production of a sufficiently plane plexiglass plate, for example with a planeness of an optical polished glass of 0.2 $\mu$m/cm, is very inexpensive in contrast to glass plates of the same planeness.

The stretched structure has the advantage that no membrane oscillation with the accompanying complications will occur.

Coupling of the membrane 4 to the fluorescent plate 5 due to pressure impulses is avoided by means of evacuating the interior of the chamber between the plates 3 and 5 to about 10 Torr, which can be obtained with no problem due to the spacing system by spacing elements 2 and 7. By utilizing the exterior pressure acting on the device 20, the membranes are pressed and fixed at the spacing elements 2 and 7. Thus, the fixing of the plates eliminates the requirement of an adhesive material.

To total area of the plate 5 for an alpha numeric or graphic illustration of a conventional sort even in the most unfavorable case is a magnitude higher than the area taken up by the image points for the particular symbol. This guarantees a sufficiently great picture luminosity. When a situation in which the number of active image points becomes very small occurs, the fluorescent light transit time and thus the absorption loss at the metallized edge areas increases rapidly and will create a strong effect for leveling of the image point luminosity to be dependent on the number of activated image points which is desirable. It is empirically guaranteed that the image point luminosity, which is somewhat dependent on the total amount of information points, will not be of any problem to the observer.

The optical contacting material is to be permanently fixed locally at the image points. This is obtained by means of small depressions 21 and 21' as illustrated in FIG. 2 in which the contacting material moistens or wets the plexiglass surface of plates 3 and 5. However, it does not moisten the pigment layer 9 or the insulating layer 13 on the membranes and thus has an edge angle greater than 90°. Nonmoistening of the membrane, however, does not mean that the membrane cannot adhere to the synthetic material plates.

By means of specifying the shape or form of the depressions 21 and 21', which form the image points, the image point size and shape is reproducibly determined. Thus, the force required to remove the membrane from an image point can also be made reproducible. In addition, for the contacting or removal process, no essential expansion of the contacting material in the picture plane is required.

In the course of addressing the conductive strips forming the electrodes, the membrane can receive a power thrust by means of the voltage pulse, which power thrust is sufficient in order to bring an element to act or respond even though there is a time delay. Because the mechanical pulse can be stored in the membrane, this means that an additional further increase in the write velocity is possible.

The light dispersing layer 9 on the membranes must meet the requirement that the layer disperses the fluorescent light in great angles (≳about 40°) which, for example, is the case with the pigment layers. An electrically controllable light dispersing liquid crystal layer or a ferroelectric ceramic layer which has an electrical controllable light dispersement, do not meet this requirement and, therefore, cannot be considered as a controlled medium.

Several quantitative disclosures for the functioning of the screen or display 20 by means of typical examples are as follows:

1. Power of attraction K of two electrode plates by means of an electrical field is in accordance to the equation:

$$K = \frac{1}{2} \epsilon \epsilon_o \left(\frac{U}{D}\right)^2 F$$

wherein D = the distance between electrodes = $4 \cdot 10^{-4}$ cm; U = voltage = 30 volts; and F = electrode area — 1 mm × 0.1 mm = $10^{-7}$ m². For the above values, K = $2.5 \cdot 10^{-6}$ kp. For a membrane element, it holds true that the $$\frac{\text{force of the field}}{\text{force of gravity}} \approx 5 \cdot 10^3.$$

This should hold true as a criteria so that mechanical vibrations do not have any effect upon the indication of the display.

2. Maximum deflection δ of the elastic membrane when supported in accordance to the equation;

$$\delta = \frac{1}{4} \frac{K \cdot b^2}{E \, d^3}$$

wherein b = the distance between the supports = 1 mm, E = the elastic modulus of the membrane = $3 \cdot 10^4$ kp/cm², and d = the membrane thickness = 10 μm. For these values, δ ≈ 2 μm.

3. Supposing that the mass moment of inertia will determine the switching time t, it holds true that $$t = \sqrt{\frac{4\delta \, d^3 \rho}{\epsilon \, \epsilon_o \, u^2}}$$

wherein ρ = mass density = 1 (g/cm³,) t ≈ $2 \cdot 10^{-5}$S.

4. Adhesion work. If a liquid is brought into contact with a solid body, energy is gained on one hand because the solid body and the liquid surface disappear; however, on the other hand energy must be applied in order to produce a new border area. The difference of the energy gain per unit area in relation to the lost free energy is the adhesion work $W_{s,f}$.

$$W_{sf} = \sigma_s + \sigma_f - \gamma_{s,f}$$

wherein $\sigma_s$ = the surface tension of the solid body, $\sigma_f$ = the surface tension of the liquid, $\gamma_{s,f}$ = the surface tension between the solid and liquid body. $W_{s,f}$ can be positive as well as negative for a border area solid body/liquid.

To remove the membrane at an image point the separation work is now Seapration work = $W_{s,f}$ · image point area = $2 \cdot 10^{-4}$ dyncm with the image point area ≈ $2 \cdot 10^{-3}$ cm² and $W_{s,f}$ = 0.1 (dyn/cm). For simplification, if one assumes that the approximation is valid, then:

Separation force = (separation work/separation path).

When the separation path is approximately 1 μm, then one obtains the necessary separation force of $2 \cdot 10^{-6}$ kp.

The separation force produced by means of electrical field is measured in such a manner that with considerations for all production tolerances and the low temperature dependency of the surface tensions, this force will always be above the threshold for separating the membranes. Since no cross-talk effects are present, the electrical field can be made as large as one chooses.

Figure 5:
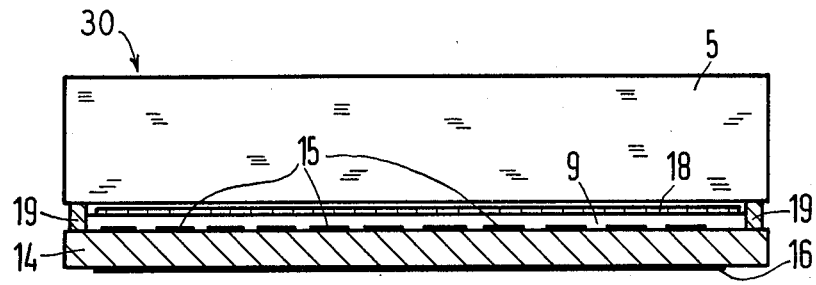
FIG. 5 is a cross-sectional view illustrating the second embodiment of the present invention.

A second embodiment of the indicating device or screen is generally indicated at 30 in FIG. 5. Instead of controlling the emergence of the fluorescent light by electro-mechanically controlled membranes, the device 30 locally controls the decoupling or emergence of the fluorescent light by utilizing a surfce deformation of a ferroelectric ceramic which deformation is dependent on the remanent electrical polarization. When an electrical field is applied to a ferroelectric ceramic plate which has a direction of polarization extending perpendicular to a surface, the plate will expand in the direction of polarization with the direction of expansion being vertical to the surface of the plate, with the amount of expansion being directly related to the amount of polarization. If the polarization conditions vary across the ceramic plate, then an image of the profile of the polarization will be formed as a flat relief on the ceramic surface, see the article by C. E. Land, W. D. Smith, Digest of Technical Papers, page 26, Soc. Inform. Display, 1973. The optical contact with the fluorescent plate is produced at the raised locations of the relief. The picture content can be altered by means of locally altering the electric field being applied to the remanent polarization by changing the voltages applied to the conductor paths on both sides of the ferroelectric ceramic plate. Here too, a durable permanent storing of a picture content may be provided.

In the device 30 illustrated in FIG. 5, a fluorescent synthetic material plate 5 and a ferroelectric ceramic plate 14 are spaced apart by a peripheral spacer 19. The plate 14 can be, for example a lead zirconate/lead titinate, with an addition of 7 atom % lanthanum and has the thickness of about 250 $\mu$m. The ceramic plate 14 is provided with parallel strip conductor paths 15 on one surface and 16 on the other surface with the paths 16 extending perpendicular to the paths 15. As illustrated, the paths 15 are coated with a light dispersing layer 9 which, in turn, is coated with a contact film 18 that faces the ceramic material plate 5. Means are provided for selectively applying a voltage between the selected paths 15 and 16 so as to be able to cause selected areal portions of the layers 9 and 18 to move into image point contact with the surface of the fluorescent plate 5 to form exit windows.

Both embodiments of the present invention display many advantages. These advantages include a passive display with exceeding low demand for electrical energy; a passive display with very short switching times; a passage display with very good readability, which is not dependent on the observation angle; and a passive display with unlimited storage times or duration. In addition, indicating device of the present invention has a matrix construction which eliminates distortion problems and can function in very wide temperature ranges. Finally, the indicating device of the present invention has a simple construction, which is primarily made of easily workable synthetic materials.

Although various minor modifications may be suggested by those versed in the art, it should be understood that we wish to employ within the scope of the patent warranted hereon, all such modifications as reasonably and properly come within the scope of our contribution to the art.

We claim:

1. An indicating device for projecting symbols of all kinds comprising a plate of fluorescing synthetic material, said plate having metallized edges to create a light trap for fluorescent light created in the plate; a layer of light dispersing material mounted in spaced relationship to a surface of said plate; a contact film disposed in at least selected areas between the layer and said plate; and means for selectively moving portions of the layer into optical contact with the contact film and plate to cause decoupling of the fluorescent light from said plate, said means including a plurality of electrodes disposed in the device in a given pattern and means for selectively applying electrical voltage of the electrodes to create a selected arrangement of electrical fields to move desired portions of the layer into contact with the plate to create a display of a desired symbol.

2. An indicating device according to claim 1, wherein the means for selectively moving comprises a ceramic plate of ferroelectric material with the electrodes disposed thereon, said layer of light dispersing material and said layer of contacting material being disposed on the ceramic plate so that an application of electrical current to the electrodes causes selected expansion of the plate due to a remanent electrical polarization to move the layer into contact with the plate of fluorescing synthetic material to display the desired symbol.

3. An indicating device according to claim 1, wherein the light dispersing layer consists of a color pigment layer.

4. An indicating device according to claim 1, which includes a second plate spaced from the first mentioned plate with the layer interposed therebetween, said first mentioned plate and second plate having parallel strip electrodes arranged thereon, said means for moving comprising strip-shaped synthetic material membranes stretched between the first mentioned plate and second plate by a plurality of parallel extending spacer elements arranged with the electrode being disposed between the spacer members, said membranes being provided with a pattern of parallel extending electrodes on one surface connected to an identical pattern of parallel extending electrodes on the other surface with the surface facing the first mentioned plate having the light dispersing layer which is nonconductive and the other electrodes of the membranes being covered by a nonconductive coating and wherein the electrodes on said plate form a cross grating pattern with the electrodes disposed on the membranes to form a raster pattern of image points.

5. An indicating device according to claim 4, wherein the light dispersing layer consists of a colored pigment layer.

6. An indicating device according to claim 4, wherein the surface of each of said two plates facing the membrane has a plurality of shallow depressions arranged in a raster pattern, said contact film being disposed in said shallow depression.

7. An indicating device according to claim 6, wherein the contact film moistens the surfaces of said plates without moistening the light dispersing layer and the nonconductive coating.

8. An indicating device according to claim 4, wherein the surface tension of all partners between which said optical contact can be created are chosen in such a manner that after switching off said optical contact creating electrical voltage all the membrane elements which have been deflected by this voltage into contact with the given plate, remaining mechanically adhering to the plate.

9. An indicating device according to claim 4, wherein each of the plates are of a material having the same thermal coefficient of expansion.

10. An indicating device according to claim 4, wherein the intervening space between the two plates is tightly sealed and evacuated.

* * * * *